United States Patent [19]
Shima et al.

[11] Patent Number: 6,011,675
[45] Date of Patent: Jan. 4, 2000

[54] TAPE CASSETTE

[75] Inventors: Motohiko Shima; Masaru Ikebe, both of Nagano, Japan

[73] Assignee: TDK Corporation, Japan

[21] Appl. No.: 08/910,379

[22] Filed: Aug. 13, 1997

[30] Foreign Application Priority Data

Aug. 23, 1996 [JP] Japan .................................. 8-239934

[51] Int. Cl.[7] .............................................. G11B 23/087
[52] U.S. Cl. ............................................................. 360/132
[58] Field of Search ......................... 360/132; 242/347.1

[56] References Cited

U.S. PATENT DOCUMENTS 4,881,696  11/1989  Mizutani et al. ...................... 360/132

FOREIGN PATENT DOCUMENTS 7-3517  1/1995  Japan .

Primary Examiner—Robert S. Tupper
Attorney, Agent, or Firm—Lerner, David, Littenberg, Krumholz & Mentlik, LLP

[57] ABSTRACT

A tape cassette capable of preventing detachment of a lid structure from a casing and reducing a manufacturing cost thereof while being simplified in structure. A lid structure including a front lid, an upper lid and a rear lid is arranged in a manner to open and close with respect to a casing including an upper casing member and a lower casing member. The rear lid is provided on opposite sides thereof with a pair of guide pins, which are movably fitted in guide grooves of the lower casing member, respectively. The rear lid is formed with projections, which are abutted against an upper end of the front lid when the rear lid upwardly opens in association with the front lid, resulting in disengagement of the guide pins from the guide grooves being prevented.

3 Claims, 4 Drawing Sheets

F I G. 2
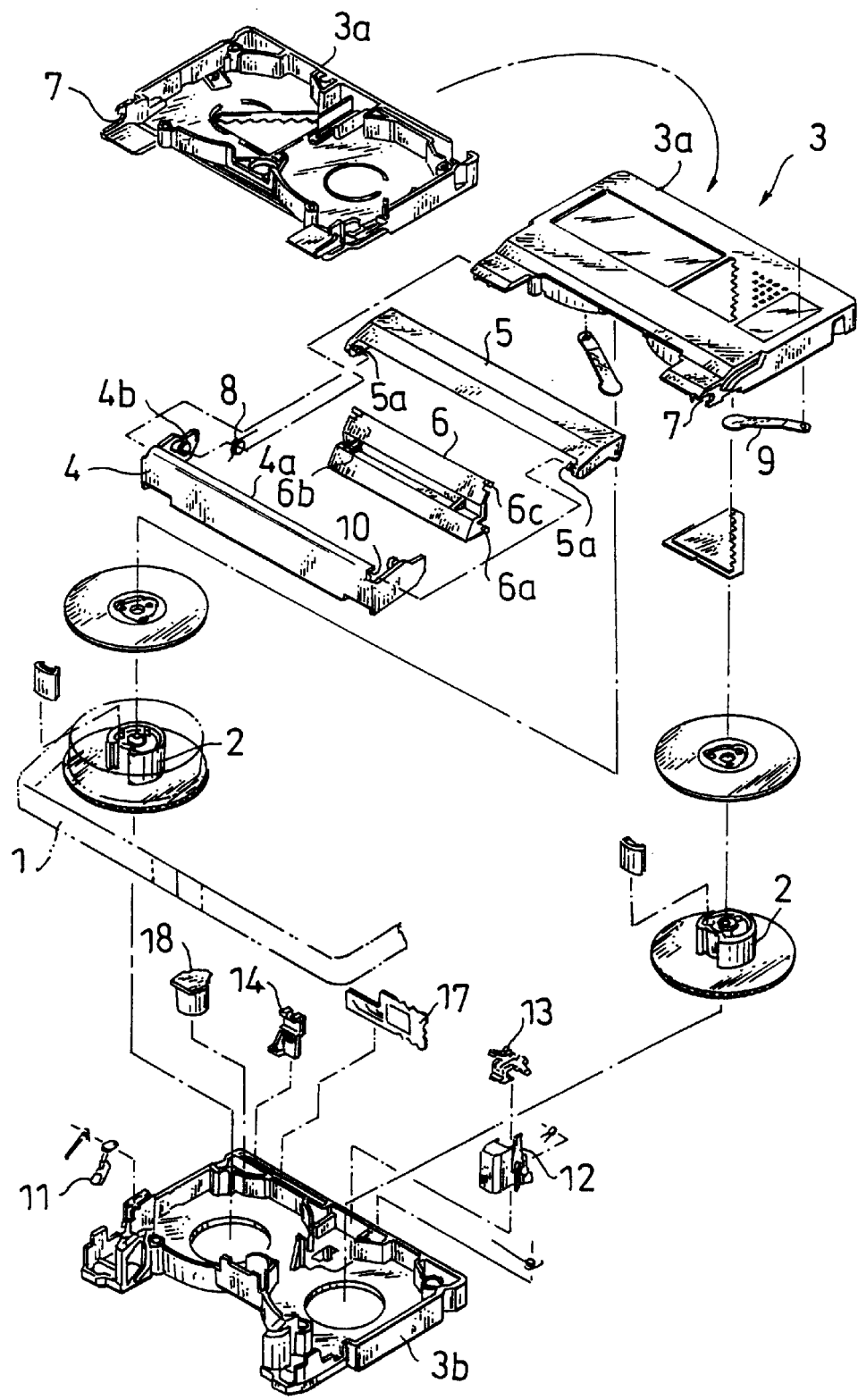

TAPE CASSETTE

BACKGROUND OF THE INVENTION

This invention relates to a tape cassette such as a digital video cassette, an 8 mm video cassette or the like in which a tape-like record medium such as a magnetic tape or the like is received, and more particularly to a tape cassette which is suitable for use for a recording/regenerating apparatus, in particular, a magnetic recording/regenerating apparatus such as, for example, a video tape recorder (VTR) and includes a lid structure for covering front, rear and upper surfaces of a tape-like record medium (hereinafter also referred to as "tape").

A tape cassette of such a type which has been conventionally used in the art often includes a lid structure which includes an upper lid for covering an upper surface of portion of a tape traveling along a front opening of a cassette casing and front and rear lids for covering front and rear surfaces of the portion of the tape while interposing the portion of the tape therebetween, to thereby prevent adhesion of dust to the tape, pollution of the tape by the fingers and damage to the tape.

For example, one conventional tape cassette of this type is constructed in such a manner as shown in FIG. 1. More particularly, the tape cassette includes a rear lid 26 provided with a pair of guide pins 26a which are loosely fitted in respective guide grooves 36 formed at a lower casing member 23b, to thereby permit the rear lid 26 to be guided while being slid when it is opened in association with a front lid 24, resulting in a locus of movement of the rear lid 26 during opening of the lid being defined. Another conventional tape cassette is disclosed in Japanese Utility Model Publication No. 3517/1995. The tape cassette disclosed includes a cassette casing formed by joining an upper casing member and a lower casing member to each other. The lower casing member is provided with a pair of rear lid guide grooves and correspondingly the upper casing member is provided with a pair of projections, so that the guide grooves are closed at an upper end thereof with the projections, respectively.

In the conventional tape cassette shown in FIG. 1, the rear lid 26 is formed at an intermediate portion thereof with a recessed portion 26b by bending the portion for the purpose of reinforcing the rear lid 26. Unfortunately, when excessive force is undesirably applied to the rear lid 26 during opening of the rear lid, an upper end 24a of the front lid 24 is caused to bite into the recessed portion 26b of the rear lid 26, leading to upward disengagement of the guide pins 26a from the guide grooves 36. The tape cassette disclosed in Japanese Utility Model Publication No. 3517/1995 eliminates the above-described disadvantage encountered with the tape cassette shown in FIG. 1. However, it requires that the front lid is formed on an inner surface thereof opposite to each of the projections with a relief. Unfortunately, this causes a die for molding the cassette casing to be complicated in structure and renders a combination of a support shaft or pin of each of the lids and/or a guide pin thereof with a pin support hole and/or a guide groove troublesome. Also, it is apt to cause detachment of the shaft or pin from the hole or groove due to shock applied to the casing when it is dropped.

SUMMARY OF THE INVENTION

The present invention has been made in view of the foregoing disadvantages of the prior art.

Accordingly, it is an object of the present invention to provide a tape cassette which is capable of facilitating assembling thereof irrespective of the fact that a lid structure is constituted by lid members as many as three in number.

It is another object of the present invention to provide a tape cassette which is capable of preventing a failure in operation of a lid structure due to shock applied to the tape cassette when it is dropped.

It is a further object of the present invention to provide a tape cassette which is capable of effectively preventing a lid structure from being detached from a casing during pivotal operation of the lid structure or due to application of shock applied to the tape cassette by dropping thereof.

It is still another object of the present invention to provide a tape cassette which is capable of ensuring reinforcement of a lid structure and smooth operation thereof.

It is yet another object of the present invention to provide a tape cassette which is capable of exhibiting increased safety and reliability.

It is a still further object of the present invention to provide a tape cassette which is capable of reducing a manufacturing cost of the tape cassette while keeping a molding die for the tape cassette from being complicated and simplifying the manufacturing.

In accordance with the present invention, a tape cassette is provided. The tape cassette includes a casing formed by joining an upper casing member and a lower casing member to each other. The lower casing member is provided with a pair of guide grooves. The tape cassette also includes a pair of reel hubs rotatably received in the casing and having a tape wound thereon so as to extend therebetween while being stretched therebetween. The tape travels between the reel hubs while being guided along a front side of the casing, to thereby be delivered from either one of the reel hubs and taken up on the other reel hub. The tape cassette further includes a lid structure arranged on the casing in a manner to open and close so as to permit the tape to be selectively exposed. The lid structure includes a front lid for covering a front surface of a portion of the tape guided along the front side of the casing, an upper lid for covering an upper end of the portion of the tape and a rear lid for covering a rear surface of the portion of the tape. The rear lid is provided on opposite sides thereof with a pair of guide pins movably fitted in the guide grooves of the lower casing member, respectively. Also, the rear lid is constructed so as to upwardly open in association with movement of the front lid. Further, the rear lid is provided with at least one projection abutted against an end of an upper surface of the front lid when the rear lid upwardly opens.

In a preferred embodiment of the present invention, the rear lid is provided on an upper surface thereof with a recess, wherein the recess is formed on opposite sides thereof with ribs, respectively and the projection is comprised of the ribs.

As described above, the tape cassette of the present invention is so constructed that the rear lid is provided with at least one projection abutted against an end of an upper surface of the front lid when the rear lid upwardly opens. Such construction effectively prevents the guide pins from being upwardly disengaged or detached from the guide grooves of the rear lid due to shock undesirably applied to the tape cassette by dropping thereof or the like while keeping a molding die for the tape cassette from being complicated.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 2 is an exploded perspective view showing an embodiment of a tape cassette according to the present invention;

DETAILED DESCRIPTION OF THE PREFERRED EMBODIMENT

Now, a tape cassette according to the present invention will be described hereinafter with reference to FIGS. 2 to 5.

Figure 1:
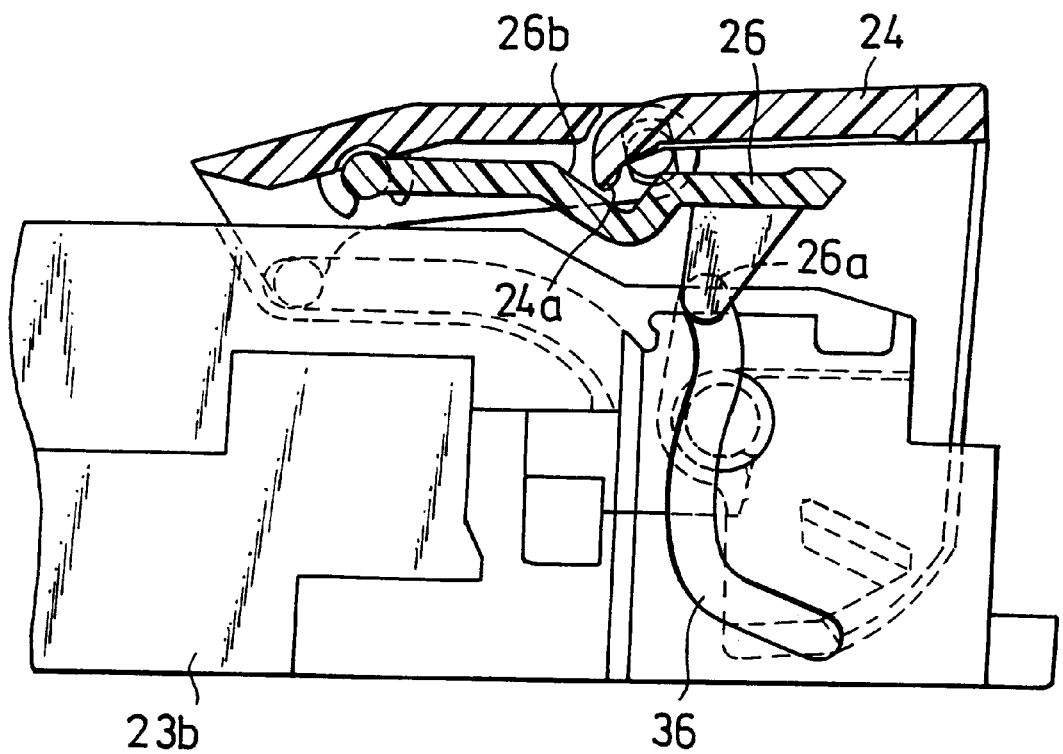
FIG. 1 is a fragmentary sectional view showing an essential part of a conventional tape cassette wherein a lid structure is kept open.
Figure 3:
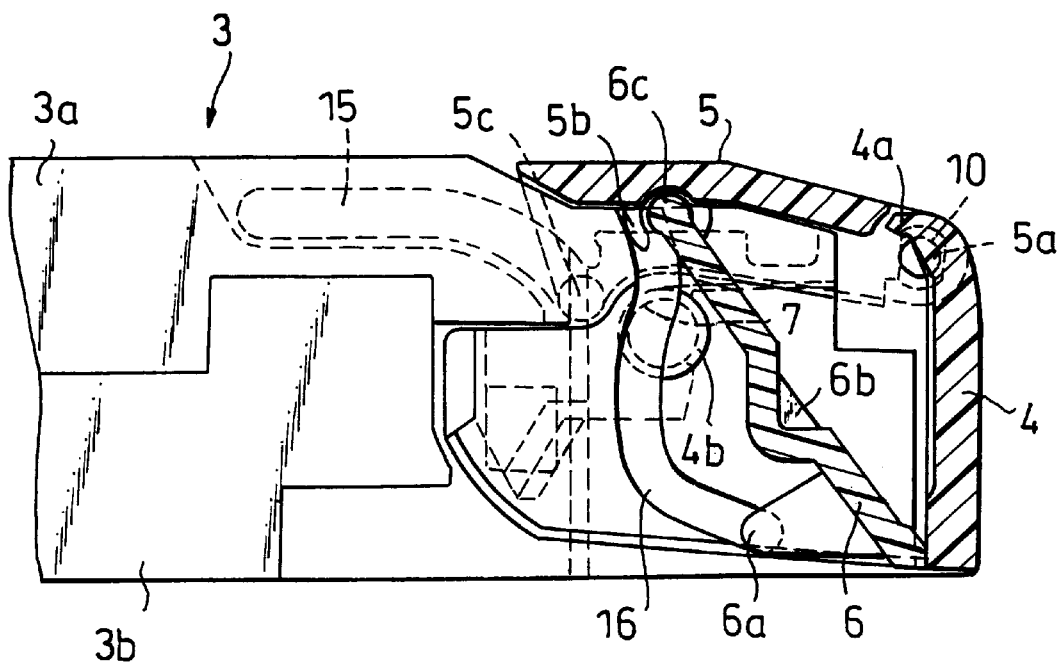
FIG. 3 is a fragmentary sectional view showing an essential part of the tape cassette shown in FIG. 2, wherein a lid structure is kept closed.
Figure 4:
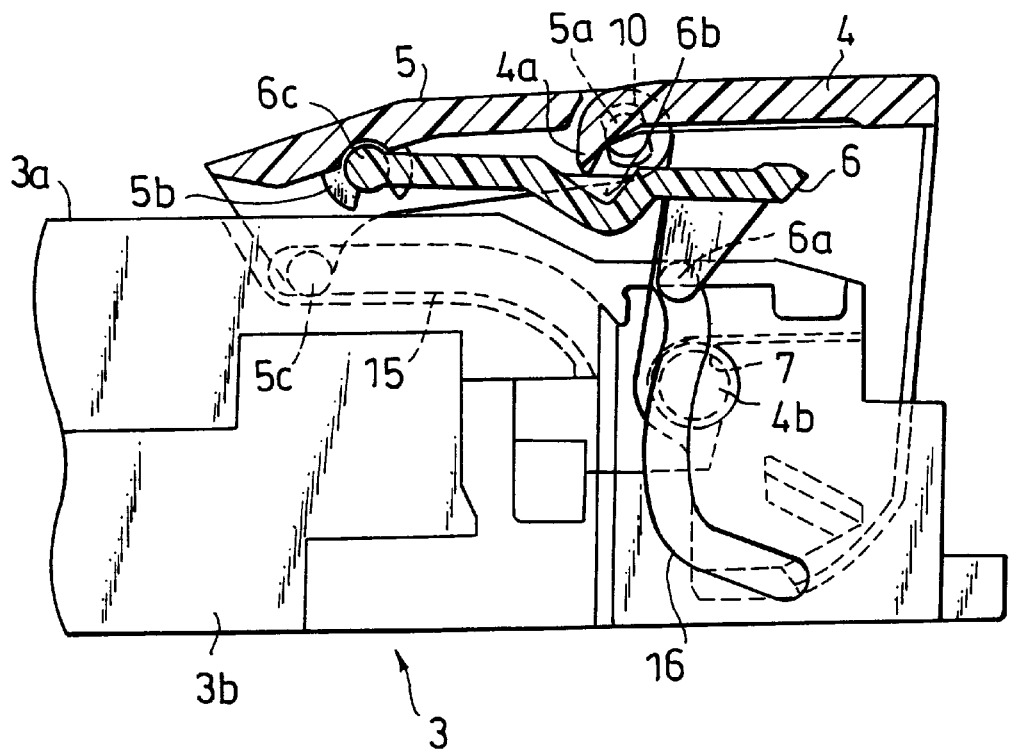
FIG. 4 is a fragmentary sectional view showing an essential part of the tape cassette shown in FIG. 2, wherein a lid structure is kept open.
Figure 5:
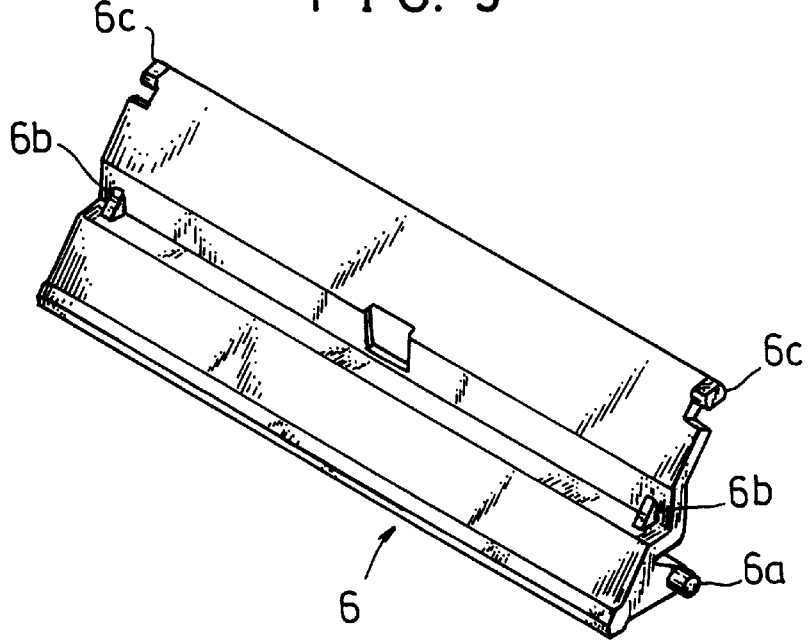
FIG. 5 is a perspective view showing a rear lid constituting a part of a lid structure incorporated in the tape cassette of FIG. 2.

Referring first to FIGS. 2 to 4, an embodiment of a tape cassette according to the present invention is illustrated. A tape cassette of the illustrated embodiment is in the form of a digital video cassette. However, the tape cassette of the present invention is not limited to such a digital video cassette. The tape cassette of the illustrated embodiment includes a casing 3 formed by joining an upper casing member 3a and a lower casing member 3b to each other. The lower casing member 3b is provided with a pair of guide grooves 16 as shown in FIGS. 3 and 4.

The tape cassette also includes a pair of reel hubs 2 rotatably received in the casing 3 and having a tape 1 wound thereon so as to extend therebetween while being stretched therebetween. The casing 3 is formed on opposite lateral portions of a front side thereof with respective openings, so that the tape may be guided so as to travel from either one of the reels through one of the openings corresponding to the one reel and the other opening corresponding to the other reel while being stretched therebetween. Thus, the tape 1 is arranged so as to travel between the reel hubs 2 while being stretchedly guided along the front side of the casing 3, to thereby be delivered from either one of the reel hubs 2 and taken up on the other reel hub 2.

Also, the tape cassette of the illustrated embodiment includes a lid structure for permitting the tape 1 to be selectively exposed from the casing. In the illustrated embodiment, the lid structure includes a front lid 4 for covering a front surface of a portion of the tape 1 guided along the front side of the casing 3, an upper lid 5 for covering an upper end of the portion of the tape 1 and a rear lid 6 for covering a rear surface of the portion of the tape 1. The lid structure is arranged on the casing in a manner to open and close, to thereby selectively expose a part of the tape from the casing 3. The front lid 4 is provided thereon with a pair of support pins 4b and correspondingly the upper casing member 3a is provided with a pair of support recesses 7, so that the support pins 4b may be fitted in the respective support recesses 7 to pivotally connect the front lid 4 to the upper casing member 3a. The upper lid 5 is provided thereon with a pair of support pins 5a through which the upper lid 5 is pivotally supported on the front lid 4. More particularly, the front lid 4 is formed with a pair of pin support holes 10 in which the support pins 5a of the upper lid 5 are operatively fitted to pivotally connect the upper lid 5 to the front lid 4, respectively. Also, the upper casing member 3a is provided with a pair of upper lid guide grooves 15 as shown in FIG. 3, in each of which a corresponding one of a pair of guide pins 5c of the upper lid 5 is guided to permit the upper lid 5 to be rearwardly moved along an upper wall of the upper casing member 3a while being substantially in parallel with the upper wall of the upper casing member 3a.

The rear lid 6 is provided with a pair of pins 6c and correspondingly the upper lid 5 is provided with a pair of supports 5b, so that the pins 6c are engagedly fitted in the respective supports 5b, resulting in the rear lid 6 being operatively connected to the upper lid 5. Also, the rear lid 6 is provided with a pair of guide pins 6a and correspondingly the lower casing member 3b is formed with a pair of a rear lid guide grooves 16, so that the guide pins 6a of the rear lid 6 are movably fitted in the respective rear lid guide grooves 16 of the lower casing member 3b, to thereby be guided therein.

The rear lid 6 is provided in proximity to opposite lateral ends thereof with a pair of projections 6b in a manner to be positionally correspond to an upper end 4a of the front lid 4 when the lid structure is open as shown in FIG. 4. The projections 6b are abutted against the upper end 4a of the front lid 4, to thereby prevent each of the guide pins 6a of the rear lid 6 from being disengaged from a corresponding one of the rear lid guide grooves 16. Thus, the rear lid 6 is arranged so as to open in association with movement of the front lid 4 and the rear lid 6 is constructed so as to upwardly open in association with movement of the front lid 4. Also, in the illustrated embodiment, the rear lid 6 may be provided on an upper surface thereof with a recess. The recess may be formed on opposite sides thereof with ribs, which constitute the projections of the rear lid 6.

In the illustrated embodiment, the projections 6b are arranged on opposite sides of the rear lid 6, respectively. However, the illustrated embodiment is not limited to such arrangement. The number of the projections 6b arranged on the rear lid 6 may be increased depending on a size of the cassette or that of the lid structure. Also, the projections 6b are preferably arranged substantially in a laterally symmetric manner, resulting in the arrangement being satisfactorily balanced. Further, the portion of the rear lid 6 on which the projections 6b are provided is formed on an upper surface thereof with a triangle recess by bending the portion of the rear lid 6 in order to ensure strength or rigidity of the rear lid as shown in FIG. 4. Alternatively, the surface may be formed into a flat shape, resulting in the whole surface of the rear lid 6 being substantially flush or flat. Such construction results in the upper end 4a of the upper lid 4 being abutted against the surface of the rear lid 6. This may cause a thickness of the portion to be increased, leading to formation of a sink mark, resulting in a deterioration in appearance of the rear lid. Such a disadvantage may be eliminated by making one or more recesses in a lower surface of the rear lid to reduce a thickness of an unnecessary portion of the rear lid while ensuring strength of the rear lid due to provision of ribs.

The front lid 4 is operatively associated with the upper lid 5 including the support pins 5a each supported on an upper edge of a corresponding one of opposite side walls of the front lid 4. Also, the front lid 4 is provided on an inner surface of each of the side walls with the above-described support pin 4b, through which the front lid 4 is pivotally mounted on the upper casing member 3a. Reference numeral 8 designates a spring for constantly urging the front lid 4 in a direction in which it is closed. The upper lid 5 is pivotally connected through the supports 5b thereof to the rear lid 6. The upper lid 5 and rear lid 6 are so arranged that the guide pins 5c and 6a are fitted in the guide grooves 15 and 16 of the casing 3, respectively. This permits the upper lid 5 and rear lid 6 to open and close in association with each other.

In the illustrated embodiment, the upper casing member 3a is provided thereon with springs 9 for forcedly supporting the reel hubs 2. Also, the lower casing member 3b is provided with a lid lock 11, which is securely mounted on the lower casing member 3b by means of a spring. The lower casing member 3b is also provided with a spring-loaded reel brake 12 and a reel brake lock 13, as well as a plug 14, an MIC detection section 17 and an optical cover 18.

As can be seen from the foregoing, the tape cassette of the present invention includes the lid structure constituted by the three lid members and constructed so as to selectively expose the tape from the casing, wherein the rear lid is provided with the projections abutted against the upper end of the front lid when the rear lid is upwardly open in association with the front lid. Such construction effectively prevents the lid structure from being detached or removed from the casing during pivotal operation of the lid structure or due to application of shock to the tape cassette due to dropping thereof or the like. Also, it ensures reinforcement of the rear lid and smooth operation of the lid structure. Further, it permits an increase in safety and reliability of the tape cassette. In addition, it reduces a manufacturing cost of the tape cassette while keeping a molding die for the tape cassette from being complicated and simplifying the manufacturing.

What is claimed is:

1. A tape cassette comprising:

a casing including an upper casing member and a lower casing member, said lower casing member being provided with a pair of guide grooves;

a pair of reel hubs rotatably received in said casing and having a tape wound thereon so as to extend therebetween while being streched therebetween, said tape traveling between said reel hubs while being guided along a front side of said casing, to thereby be delivered from either one of said reel hubs and taken up on the other reel hub; and a lid structure mounted on said casing in a manner to be moved between an opened state and a closed state so as to permit said tape to be selectively exposed said lid structure including a front lid for covering a front surface of a portion of said tape guided along said front side of said casing, an upper lid for covering an upper end of said portion of said tape and a rear lid for covering a rear surface of said portion of said tape, said front lid, upper lid and rear lid being operatively connected to one another so as to move between said opened state and said closed state;

said rear lid being provided on opposite sides thereof with a pair of guide pins movably fitted in said guide grooves of said lower casing member, respectively;

said rear lid being upwardly moved to said opened state in association with movement of said front lid; said rear lid being provided on an upper surface thereof with at least one projection which is abutted against an upper end of said front lid when said rear lid is upwardly moved to said position where said lid structure is opened in association with said front lid;

said at least one projection comprises a plurality of ribs, and wherein said rear lid is provided on said upper surface thereof with a recess, said recess being formed on opposite sides therof with said ribs.

2. The tape cassette as defined in claim 1, wherein said recess comprises a bent portion of said rear lid section at an intermediate location of said rear lid.

3. A tape cassette comprising:

a casing including an upper casing member and a lower casing member, said lower casing member being provided with a pair of guide grooves extending vertically;

a pair of reel hubs rotatably received in said casing and having a tape wound thereon so as to extend therebetween while being stretched therebetween, said tape traveling between said reel hubs while being guided along a front side of said casing, to thereby be delivered from either one of said reel hubs and taken up on the other reel hubs; and a lid structure mounted on said casing in a manner to be moved between an opened state and a closed state so as to permit a portion of said tape guided along said front side of said casing to be selectively exposed, said lid structure including a front lid pivotally supported on said casing; said front lid covering a front surface of said portion of said tape; and upper lid pivotally connected to said front lid so as to be moved to a position where said lid structure is opened in association with movement of said front lid; said upper lid covering an upper end of said portion of said tape; and a rear lid being provided on opposite sides thereof with a pair of guide pins movably fitted in said guide grooves of said lower casing member, respectively, said rear lid being pivotally supported on said upper lid so as to be upwardly moved to position where said lid structure is opened in association with movement of said front lid; said rear lid covering a rear surface of said portion of said tape;

said front lid, upper lid and rear lid being operatively connected to one another so as to open and close said lid structure;

said rear lid being provide on an upper surface thereof with at least one projection which is abutted against an upper end of said front lid when said rear lid is upwardly moved to said position where said lid structure is opened in association with said front lid;

said rear lid including a bent part of a V-shaped in section at an intermediate portion thereof to form a recess on the upper surface thereof, said recess being formed on opposite sides thereof with ribs, respectively, said projection being comprised of said ribs.

* * * * *

UNITED STATES PATENT AND TRADEMARK OFFICE
CERTIFICATE OF CORRECTION

PATENT NO. : 6,011,675
DATED : January 4, 2000
INVENTOR(S) : Shima et al.

It is certified that error appears in the above-identified patent and that said Letters Patent is hereby corrected as shown below:

Column 5, line 47, delete "exposed said" and therefor insert -- exposed, said --
Column 6, line 24, delete "hubs" and therefor insert -- hub --
Column 6, line 32, delete "and" and therefor insert -- an --
Column 6, line 49, delete "provide" and therefor insert -- provided --
Column 6, line 54, delete "V-shaped" and therefor insert -- V-shape --

Signed and Sealed this

Seventh Day of November, 2000

Attest:

Q. TODD DICKINSON

*Attesting Officer*           *Director of Patents and Trademarks*